United States Patent [19]

Bjoerk et al.

[11] Patent Number: 5,201,510
[45] Date of Patent: Apr. 13, 1993

[54] SHEET FILM MAGAZINE FOR A FILM CHANGER

[75] Inventors: Erik Bjoerk, Sundbyberg; Ola Wiklund, Jaerfaella; Johan Egerstroem, Nacka, all of Sweden

[73] Assignee: Siemens Aktiegesellschaft, Munich

[21] Appl. No.: 844,310

[22] Filed: Mar. 2, 1992

[30] Foreign Application Priority Data

Mar. 5, 1991 [EP] European Pat. Off. ........ 91103366.0

[51] Int. Cl.[5] ............................................. B65H 3/06
[52] U.S. Cl. ................................. 271/118; 271/121; 271/124; 271/167
[58] Field of Search ............... 271/118, 121, 124, 167, 271/169, 138, 137, 10, 104, 116

[56] References Cited

U.S. PATENT DOCUMENTS 3,869,116  3/1975  Kroeker .
3,961,785  6/1976  Gall ................................ 271/121 X
4,234,796  11/1980 Caugant et al. .
4,541,625  9/1985  Yuguchi et al. .

FOREIGN PATENT DOCUMENTS 0025390   3/1981  European Pat. Off. .
0402491  12/1990  European Pat. Off. .
2007594   9/1970  Fed. Rep. of Germany .
2747623   3/1984  Fed. Rep. of Germany .

OTHER PUBLICATIONS

Johnson "Normal Force System for Magnetic Card Feeder", Xerox Disclosure Journal, vol. 5, No. 6, Nov./Dec. 1980, pp. 587-588.

Primary Examiner—David H. Bollinger
Attorney, Agent, or Firm—Hill, Steadman & Simpson

[57] ABSTRACT

A sheet film magazine for a film changer comprises a housing and a cover that form a space for storing a stack of unseparated sheets of film that lie against a film plane. The magazine includes a conveyor which is provided for conveying individual sheets of film from the film stack through a film exit opening of the sheet film magazine into a receptacle part of said film changer. So that only one sheet of film is conveyed out of the magazine, the sheet film magazine is provided with a control arrangement adjoining the exit opening and the arrangement guarantees that only one sheet is removed at a time.

11 Claims, 3 Drawing Sheets

SHEET FILM MAGAZINE FOR A FILM CHANGER

BACKGROUND OF THE INVENTION

The present invention is directed to a sheet film magazine for a film changer, which film magazine comprises a housing and a cover that forms a space for storing a stack of unseparated sheets of film that lie on a film plane, and has a conveyor means for conveying individual sheets of film from the film stack through a film discharge opening of the sheet film magazine into a receptacle part of the film changer.

U.S. Pat. No. 4,541,625, whose disclosure is incorporated herein by reference thereto, discloses a sheet film magazine having a conveyor means. The conveyor means for the sheets of film comprises a plate that can be lowered down onto the uppermost sheet of film of a stack of films based on an arrangement of gear wheels and springs. Subsequently, the plate displaces the uppermost sheet of film toward a back of the container in a direction opposite to the exit direction so that the back end of the sheet of film is lifted with rails and is introduced into a slot. After this displacement of the sheet of film, the plate lifts off from the surface of the uppermost sheet of film. While in this position, the front end of the stack of sheets of films are pressed downward away from the film exit opening, while the uppermost sheet of film will now lie in a plane which extends toward the exit opening. A shaft having a hook attached thereto is in the position of the slot and grabs the back or trailing edge of the sheet of film and, thus, thrusts the sheet of film through the film exit opening into a receptacle part. This sheet film magazine is extremely complicated in structure and is, therefore, expensive to manufacture.

German Published Application 27 47 623 discloses a sheet film magazine that is not provided for a film changer. The conveyor means of this sheet film magazine comprises a pressure plate that presses against the uppermost sheet of film of the film stack. The pressure against the uppermost sheet of film also influences the lower sheet of film that is, thereby, pressed against a conveyor roller that will convey the lowermost sheet of film out of the magazine. Since a plurality of sheets of film in the film stack can stick to one another due to static electricity, this device cannot guarantee that two sheets of film are not simultaneously conveyed out of the magazine.

U.S. Pat. No. 4,234,796, whose disclosure is incorporated herein by reference thereto, discloses a film changer having an integrated, bent sheet film magazine. A conveyor roller presses against the film stack and conveys the uppermost sheet of film of the film stack to further conveying rollers that will convey the sheet of film into a receptacle unit. As a result of the described structure of the conveyor means, it is not guaranteed that only one sheet of film is conveyed out of the magazine at one time.

SUMMARY OF THE INVENTION

The object of the present invention is to provide a sheet film magazine that employs extremely simple means and guarantees only, respectively, one sheet of film being conveyed out of the magazine.

To accomplish this objective, the present invention is directed to an improvement in the sheet film magazine for film changers, said magazine comprising a housing and a cover that form a space for storing a stack of unseparated film sheets that lie against a film plate and include a conveying means for conveying individual sheets of film from the film stack through a film exit opening of the sheet film magazine into a receptable part of a film changer. The improvements include a control means which guarantees only, respectively, one sheet of film being conveyed out of the magazine. The control means comprises the film exit opening, whose height amounts to less than the thickness of two sheets of film and also includes at least one first hold-down means which is positioned adjacent the film exit opening and presses at least one sheet of film against a film plane formed by the plate. As a result of the extremely simple structure of the control means for the sheets of film, it is guaranteed that, respectively, only one sheet of film is conveyed out of the sheet film magazine. The hold-down means controls the sheets of films so that the leading edge of these sheets of films that are to be conveyed out of the magazine come to lie exactly in front of the film exit opening. On the basis of the height dimensions of this exit opening, the opening, in turn, assures that only, respectively, one sheet of film can pass therethrough at a time.

It is proposed in an advantageous development of the invention that the first hold-down means comprises a head that is attached to one end of a shaft that proceeds roughly parallel to the film plane and whose other end is arranged rotatably around an axis of an axle. What is thereby achieved is that the head describes a perpendicular motion vis-a-vis the film plane in the immediate proximity of the wall of the film exit opening. This will cause a result of the sheet of film being pressed against the film plane immediately before the sheet of film is conveyed out of the film exit opening and during a time wherein the sheet of film is conveyed out of the film exit opening.

An advantageous improvement of the invention occurs wherein the shaft is spring-loaded so that it presses the head against the surface of the sheet of film. The pressure that is required in order to bring the sheet of film into the desired position or to hold it there can be produced in this way.

A structurally simple fashioning of the invention is obtained in that the head is attached to the shaft rotatably around the longitudinal axis thereof. As a result thereof, the application face of the head can always lie against the film plane, regardless of whether the film plane is flat or not flat.

It is proposed in a further construction of the invention that the part of the head that lies against the surface of the sheet of the film is rounded off or, respectively, beveled at the edge facing away from the film exit opening. It is, thus, assured that the head always lifts off from the film plane when the sheet of film presses thereagainst.

An especially beneficial construction of the invention is obtained when the conveyor means comprises a conveyor wheel that is arranged in the region of the exit opening and is driven with drive means in the conveying direction of the sheet of film. The conveyor wheel is connected to positioning means, which will vary the distance between the sheet of film and the conveyor wheel so that when conveying a sheet of film from the sheet film magazine to the receptacle part, the conveyor wheel lies against the surface of the sheet of film and is removed from the surface of the sheet of film after the film conveying has been ended. A second hold-down means that presses against the upper side of the sheet of film in the direction toward the conveyor wheel is attached exactly in front of the conveyor wheel. This embodiment enables a reliable, continuous conveying of the sheet of film out of the magazine. The second hold-down means presses constantly against the film stack so that the conveyor roller engages the closest sheet of the stack.

It is proposed in an advantageous development of the invention that the sheets of film are stored in the space in a bent condition. Thus, a small and compact sheet film magazine is obtained.

It is proposed for the structural simplification of the invention to fashion the second hold-down means as an elongated part that is rotatably attached to the axle of the first hold-down means.

It is proposed in a further development of the invention that the spring power for the first hold-down means and for the second hold-down means will differ in size. This is advantageous, since the first hold-down means, particularly in combination with the magazine, wherein the sheets of film are stored in a bent condition, only presses against the individual sheets of film, whereas the second hold-down means is intended to press a stack of film sheets down.

It is proposed, in view of a further development of the invention, that after the end of the film conveying, the conveyor wheel is separated from the surface of the sheet of film with the assistance of a separating element of the positioning means before the sheet is completely removed from the magazine. This means that the conveyor wheel is removed from the surface of the sheet of film immediately after the conveying thereof, so that a new sheet of film can be quickly brought into the starting position.

In an improvement of the proposed development of the invention, it is proposed that the positioning means contains a roller arranged in the magazine. This roller lies against a cam plate that is shaped so that it presses the conveyor wheel against the surface of the sheet of film with the assistance of the roller in a first position and will lift off from this surface when the roller is in a second position.

In an advantageous development of the invention, the roller is quickly brought out of its position by the separating element when the cam plate starts to turn opposite to the film conveying direction so that the conveyor wheel is separated from the surface of the sheet of film. The described immediate separation of the conveyor wheel from the surface of the sheet of film is, thereby, achieved.

It is also proposed within the framework of the invention that the separating element comprises a rocker or rocker arm that is rotatable around an axis and the roller is arranged rotatably around a second axis on the rocker arm. As a result of movement of the rocker, the roller can be quickly laterally displaced out of its position of the cam plate in a simple way so that the conveyor wheel immediately lifts off the surface of the sheet of film.

Other advantages and features of the invention will be readily apparent from the following description of the preferred embodiments, the drawings and claims.

BRIEF DESCRIPTION OF THE DRAWINGS

FIGS. 1–4 are side views of the sheet film magazine connected to a receptacle with portions removed for purposes of illustration, wherein:

FIG. 1 illustrates a starting position;

FIG. 2 illustrates a position with the beginning of the conveying of the first film;

FIG. 3 illustrates the position of the conveying as the film is engaged by the conveyors of the receptacle; and FIG. 4 shows an illustration of the parts as the conveying is accomplished by the conveyors of the receptacle.

DESCRIPTION OF THE PREFERRED EMBODIMENTS

Figure 1:
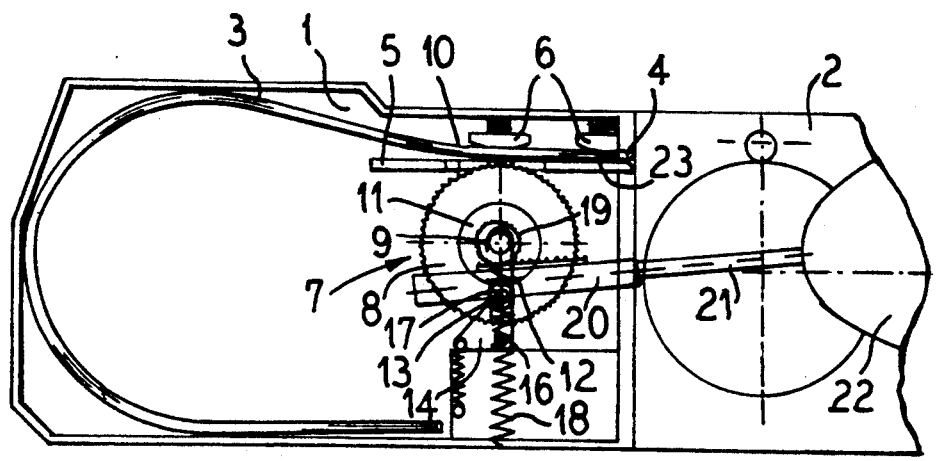

The principles of the present invention are particularly useful when incorporated in a sheet film magazine 1 that is connected to a receptacle part 2 of a film changer. The sheet film magazine 1 is loaded with a film stack 3 that is arranged in C-shaped in the magazine. The front end of the film stack 3, i.e., the end that lies adjacent a film exit opening 4 of the sheet film magazine, is clamped between a film plane formed by a plate 5 and a schematically illustrated pressing part or hold-down means for the sheet of film in the form of spring-loaded plates 6. The film plane 5, on which the film stack 3 rests, proceeds up to an exit opening 4 for the sheet of film and is in axial alignment therewith.

Conveyor means 7 is attached near the film exit opening 4 and is position under the plate forming the film plane 5. The conveyor means 7 comprises a conveyor wheel 8 that is arranged on a shaft 9 that extends parallel to the film plane 5 and that can be brought into contact with the film stack 3 through an opening 10 in the plate forming the film plane 5. The conveyor wheel 8 can, preferably, be a gear wheel. A cam plate is also secured on the shaft 9, and this cam plate is composed of a round, flat plate 11 having a recess 12 for a roller 13 that is mounted on a rocker arm 14 and presses against the plate 11. The rocker arm 14 is rotatable around an axis 16 which is formed by an axle secured to the magazine. The roller 13 that is attached to the rocker arm 14 is rotatable around a second axle or pin 17 in one direction only. The axle 16 of the rocker arm 14 and the axle 17 of the roller 13 are axially aligned with a common shaft 9 for the conveyor wheel 8 and the cam plate 11 and extend in a line substantially perpendicular to the plane 5. The conveyor wheel 8, as well as the plate 11, are spring-loaded with the assistance of a spring 18, whose one end is secured to the shaft 9 and whose other end is secured to the floor of the sheet film magazine 1. The spring 18 is a tension spring and, thus, spring-loads the plate 11 against the roller 13. A gear wheel 19 is also secured to the shaft 9. This gear wheel 19 is engaged with a toothed rack 20 that, in turn, is secured to a shaft 21 that is controlled by an eccentric 22 arranged in the receptacle 2.

In FIG. 1, the conveyor means 7 is in a parked position. This means that the conveyor wheel 8 is separated from the lowest sheet of film in the film stack 3. For this position to be reached, the roller 13 must lie in a recess 12 of the plate 11.

Figure 2:
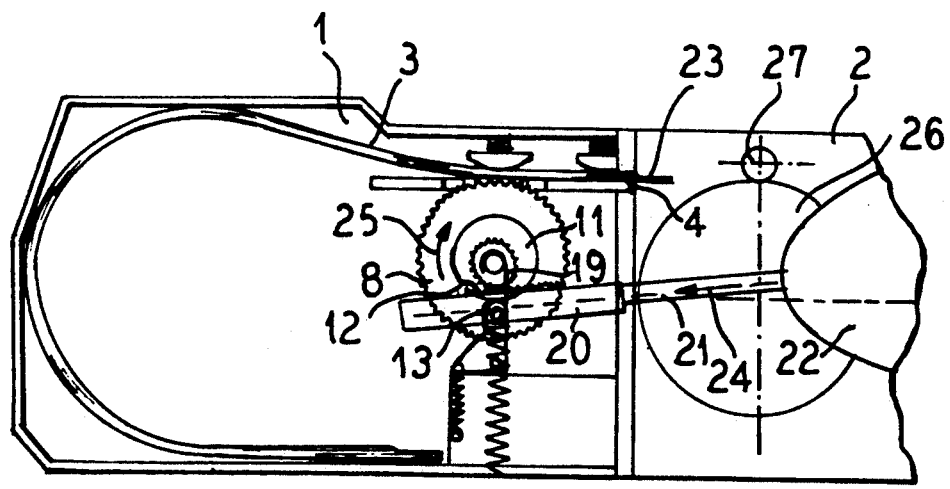

When the sheet of film 23 is to be separated from the film stack and conveyed into the receptacle part 2, the shaft 21 and the toothed rack 20 are pressed in the direction of the arrow 24 with the assistance of the eccentric 22 so that the toothed rack 20 rotates the gear wheel 19 such that it turns in the direction of arrow 25 (FIG. 2). Simultaneously, the plate 11, as well as the conveyor wheel 8, are co-turned or rotated in the same direction.

Due to the rotation of the plate 11, the roller 13 immediately leaves its position in the recess 12 and now presses against the outer periphery of the plate 11 and, thus, simultaneously presses the conveyor wheel up and, as a result thereof, the wheel 8 presses against the surface of the lowermost sheet of film 23. In this way, the conveyor wheel 8 will convey the sheet of film through the exit opening 4 into the receptacle part 2 up to the additional conveyor wheels 26 and 27, which will grasp a leading edge of the sheet of film and convey it forward for an exposure.

Figure 3:
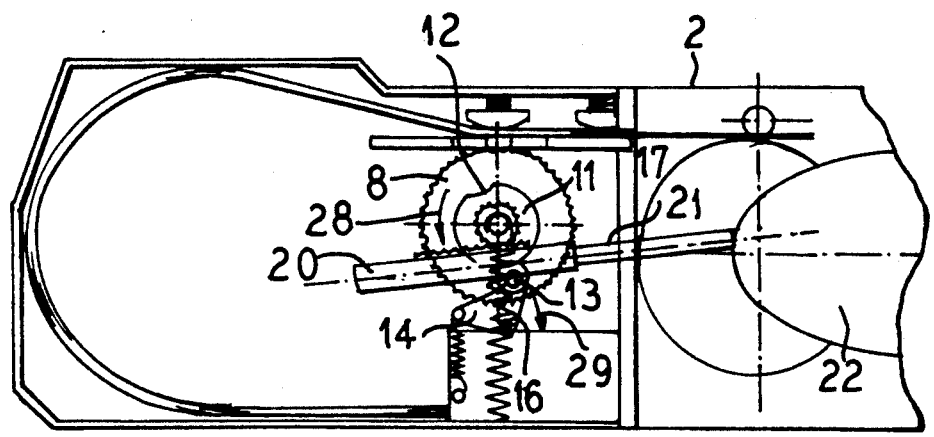

The conveyor wheel 8 is provided with a freewheeling wheel connected to the shaft 9 so that it can rotate faster than the shaft during the rapid continued conveying of the film 23 by the additional conveyor wheels 26 and 27. Thus, the wheel 8 will continue to roll with the same speed of advance as applied to the film. When the toothed rack 20 has been displaced into its outermost position, the plate 11 has assumed a position shown in FIG. 3. It is also shown in FIG. 3 that the toothed rack 20, when it reaches its outermost position, is then displaced in the opposite direction, i.e., in the direction toward the receptacle 2, due to the influencing of the shaft 21 and the eccentric 22. At that moment when the toothed rack and, thus, the plate 11 change direction, also shown by the arrow 28 (FIG. 3), the roller 13 is immediately brought out of its position. To that end, the rocker arm 14 is turned around its axis 16 in the direction of arrow 29. Simultaneously, the conveyor wheel 8 leaves the surface of the sheet of film. The roller 13 is provided with a freewheeling arrangement that runs along on the plate 11 when this is turned in a film conveying direction. When the plate 11 is turned in the opposite direction, then the roller 13 locks and slips out of its position. In other words, the roller 13 is provided with a one-way clutch arrangement so that when the plate 11 rotates in the direction of arrow 28, the roller 13 does not rotate.

Figure 4:
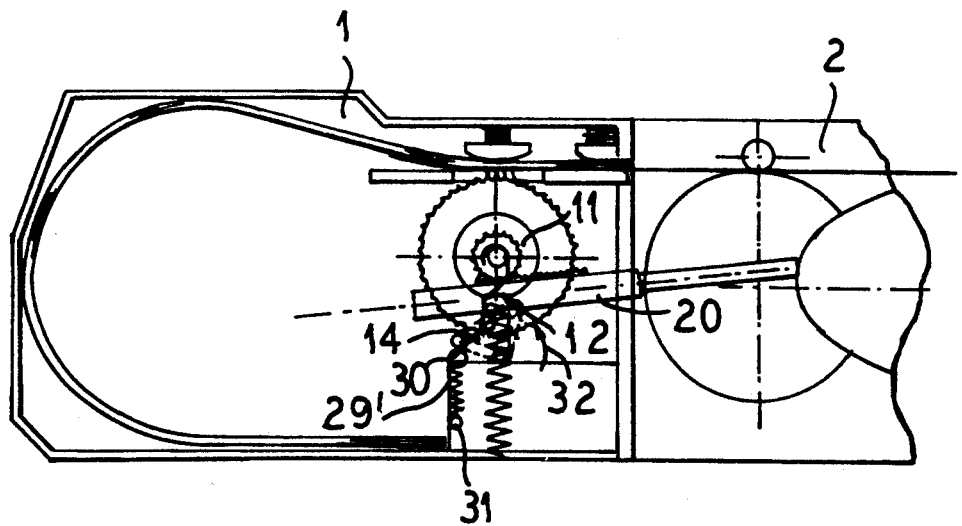

As shown in FIG. 4, the plate 11 is rotated back by the means already set forth so that the recess 12 is brought into the starting position, wherein the roller 13 can be received into the recess 12 on the basis of movement of the rocker arm 14. The rocker arm 14 is turned back into its original position, and this will occur due to the tension spring 29', whose one end is secured to a peg 30 attached to the rocker arm 14 and whose other end is secured to a peg 31 arranged in the frame of the magazine. A dot-dash rocker arm 14 in this Figure and the arrow 32 are intended to show the rotation of the rocker arm 14 from the position shown in FIG. 3 into a parked or starting position, which is the position illustrated in FIG. 1.

Only one conveyor means 7 is set forth in this exemplary embodiment. Of course, it is advantageous to employ two conveyor means 7 that are attached to the ends of the same shaft 9 that extends over the entire width of the sheet film magazine 1.

The cycle that has been set forth is repeated for every sheet of film that is to be conveyed from the magazine 1 to the receptacle part 2. An extremely high film conveying frequency is possible as a result of the rapid separation of the conveyor wheel 8 from the surface of the sheet of film even before the recess of the plate 11 has reached its parked position, wherein the roller 13 is received in the recess 12.

Figure 5:
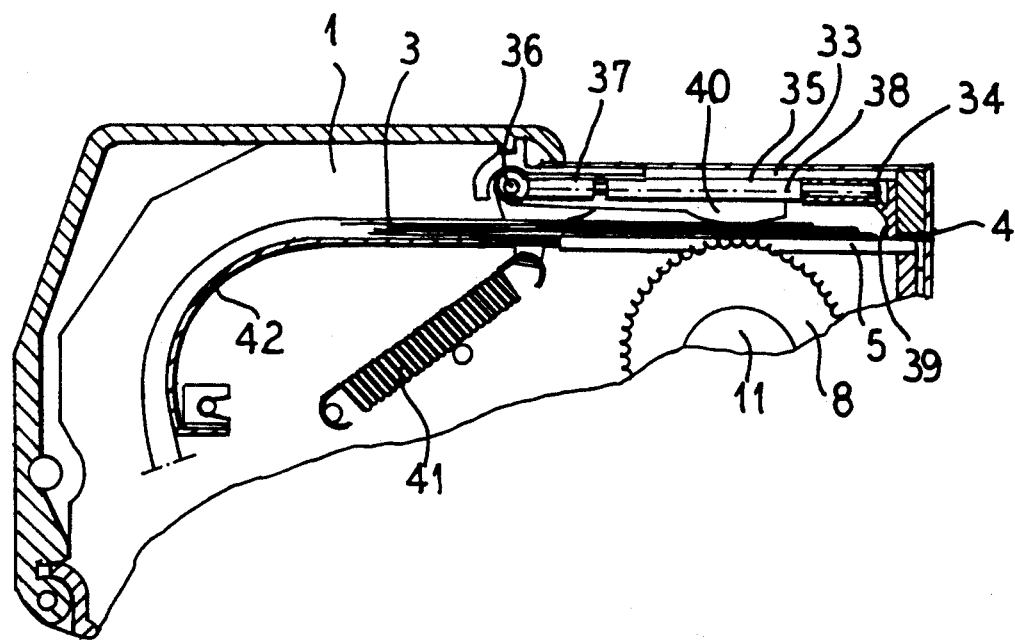
FIG. 5 is an enlarged side view with portions in elevation of the preferred control means for the magazine of the present invention.

In FIG. 5, the control means for the sheet film magazine 1 is illustrated as being arranged adjacent the film exit side. The control means comprises a film exit opening 4, whose height is less than the thickness of two sheets of film, and the means includes at least one spring-loaded, first hold-down means 33 that is positioned adjoining the film exit opening 4. The first hold-down means 33 comprises a head 34 that is secured to one end of a shaft 35 that proceeds approximately parallel to the film plane of the plate 5, and whose other end is rotatably mounted on an axis formed by an axle 36. The shaft 35 is loaded by a spring 37 so that the shaft presses the head 34 against the film plate 5. The head 34 is also rotatable around a longitudinal axis 38 of the shaft 35. The application face of the head 34 that presses against the film plane when the magazine is empty is also rounded off or provided with a bezel at an edge 39 facing away from the exit opening 4. A second hold-down means 40 is provided opposite the conveyor wheel 8, and this second hold-down means 40 comprises a longitudinal part or lever that is attached to the axle 36 of the first hold-down means 33. The second hold-down means 40 is spring-loaded with a tension spring 41.

When loading the sheet film magazine with a stack of film 3, one end of the film stack is inserted between the film plane 5 and the second hold-down means 40 and is pushed up to the head 34 of the first hold-down means 33. The rest of the length of the film stack 3 is placed against a curved plate 42 in the sheet metal magazine. In this position, the second hold-down means 40 presses against the uppermost sheet of film of the film stack 3 so that the lowermost sheet of the film is pressed against the conveyor wheel 8. When the conveyor wheel 8 is driven in the conveying direction of the sheet of film, the lowest sheet of film is pushed against the head 34 and lifts the head due to the rounded or beveled edge 39. The head 34 now presses against the surface of the sheet of film so that the front end thereof will lie exactly in front of the film exit opening 4. Even when two or three sheets of film are simultaneously conveyed and shifted under the head 34, all sheets of film, except the lowest sheet of film, strike against the wall above the film exit opening 4. When the lowest sheet of film has been conveyed out of the magazine 1, the head, due to the spring power, presses against the surface of the next lowest sheet of film until this comes to lie exactly in front of the film exit opening 4, as a result whereof this sheet of film can then be conveyed out. The spring loading of the first hold-down means 33 is adapted so that the head 34 can press a sheet of film that presses against the wall down and, simultaneously, allows the sheet of film to be conveyed out of the film exit opening 4 without the head 34 decelerating the travel of the sheet of film.

As a result of the tension spring 41 for the second hold-down means 40, a constant force against the film stack is obtained, regardless of the thickness of the stack 3. The size of the spring power of the tension spring 41 is also matched to the necessary force that is required, so that the teeth of the conveyor wheel 8 grasp the lowest film sheet of the film stack 3.

The control means 4 and 34, that have been set forth, guarantees that, respectively, only one sheet of film is conveyed out of the magazine at a time.

Although various minor modifications may be suggested by those versed in the art, it should be understood that we wish to embody within the scope of the patent granted hereon all such modifications as reasonably and properly come within the scope of our contribution to the art.

We claim:

1. In a sheet film magazine for a film changer, said magazine comprising a housing and a cover that form a space for storing a stack of unseparated film sheets that lie against a film plane, and a conveyor means for conveying individual sheets of the film from the film stack through a film exit opening of the sheet film magazine and into a receptacle part of the film changer, the film plane being formed by a plate that extends to the film exit opening and is axially aligned with a lower edge of said opening, the improvements comprising the sheet film magazine being provided with control means adjoining an exit side of the magazine, said control means guaranteeing that only one sheet of film is conveyed out of the magazine at each time, the control means including the film exit opening, whose height amounts to less than the thickness of two sheets of film, and at least one first hold-down means, which is positioned adjacent the film exit opening and presses at least one sheet of film against the plate, the first hold-down means including a head which is attached to one end of a shaft that proceeds parallel to the film plane and said shaft having a second end rotatably mounted on an axle.

2. In a sheet film magazine according to claim 1, wherein said shaft is spring-loaded so that it presses the head against the surface of the sheet of film.

3. In a sheet film magazine according to claim 1, wherein the head is rotatably attached to said shaft to rotate around the longitudinal axis of said shaft.

4. In a sheet film magazine according to claim 1, wherein the head, which lies against the surface of a sheet of film, is rounded off at an edge facing away from the film exit opening.

5. In a sheet film magazine for a film changer, said magazine comprising a housing and a cover that form a space for storing a stack of unseparated film sheets that lie against a film plane, and a conveyor means for conveying individual sheets of the film from the film stack through a film exit opening of the sheet film magazine into a receptacle part of the film changer, the film plane being formed by a plate that extends to the film exit opening and is axially aligned with a lower edge of said opening, the improvements comprising the sheet film magazine being provided with control means adjoining an exit side of the magazine, said control means guaranteeing that only one sheet of film is conveyed out of the magazine at each time, the control means including the film exit opening, whose height amounts to less than the thickness of two sheets of film, and at least one first hold-down means, which is positioned adjacent the film exit opening and presses at least one sheet of film against the plate, the conveyor means including a conveyor wheel, which is arranged in the region of the film exit opening and is driven by drive means in a conveying direction of the sheet of film, said wheel being connected to positioning means that vary the distance between a sheet of film and the periphery of the conveyor wheel so that the conveyor wheel presses against the surface of the sheet of film when conveying a sheet of film from the sheet film magazine to a receptacle part and is removed from the surface of the sheet of film after the film conveying has ended, and second hold-down means for pressing against an upper side of the sheet of film in a direction toward the conveyor wheel and being positioned in the vicinity of said conveyor wheel.

6. In a sheet film magazine according to claim 5, wherein the sheets of film are stored in a bent condition in a space of the magazine.

7. In a sheet film magazine according to claim 5, wherein the first hold-down means is mounted for rotation on an axle, and the second hold-down means is constructed as an elongated part that is rotatably attached to said axle.

8. In a sheet film magazine according to claim 7, wherein the first hold-down means includes a spring for biasing the hold-down means against the film, and the second hold-down means has a spring for urging it into engagement with the stack, said springs having different sizes.

9. In a sheet film magazine according to claim 5, wherein the positioning means includes a cam plate mounted to rotate with the conveyor wheel in both a film conveying direction and an opposite direction, said cam plate having a recess in a surface thereof, said positioning means including a roller mounted on a first axis on a separating element and engaging the periphery of said cam plate and, while engaged in said recess, allows the wheel to be retracted from engagement with said film and, when moved to a position engaging the wheel in an area outside of said recess, holds the wheel in engagement with the film to be conveyed.

10. In a sheet film magazine according to claim 9, wherein movement of the cam plate in said opposite direction causes said roller to be quickly brought out of a position by the separating element so that the conveyor wheel is separated from the surface of the sheet of film.

11. In a sheet film magazine according to claim 9, wherein said separating element comprises a rocker arm mounted for rotation on a second axis which is spaced from the first axis.

* * * * *